United States Patent
Ong

(10) Patent No.: US 7,707,897 B2
(45) Date of Patent: May 4, 2010

(54) METHOD OF MEASURING MULTIPHASE FLOW USING A MULTI-STAGE FLOW METER

(75) Inventor: Joo Ong, Houston, TX (US)

(73) Assignee: Baker Hughes Incorporated, Houston, TX (US)

(*) Notice: Subject to any disclaimer, the term of this patent is extended or adjusted under 35 U.S.C. 154(b) by 0 days.

(21) Appl. No.: 12/127,232

(22) Filed: May 27, 2008

(65) Prior Publication Data

US 2009/0293634 A1    Dec. 3, 2009

(51) Int. Cl.
  *G01F 1/74* (2006.01)
(52) U.S. Cl. ................. 73/861.04; 73/196
(58) Field of Classification Search .............. None
  See application file for complete search history.

(56) References Cited

U.S. PATENT DOCUMENTS

| | | | |
|---|---|---|---|
| 6,776,054 B1* | 8/2004 | Stephenson et al. | 73/861.63 |
| 6,935,189 B2 | 8/2005 | Richards | |
| 7,240,568 B2* | 7/2007 | Atkinson | 73/861.63 |
| 2004/0182172 A1* | 9/2004 | Richards | 73/861.04 |
| 2006/0236779 A1* | 10/2006 | Atkinson | 73/861.03 |
| 2008/0319685 A1* | 12/2008 | Xie et al. | 702/45 |
| 2009/0000390 A1* | 1/2009 | Duhanyan et al. | 73/861.04 |

FOREIGN PATENT DOCUMENTS

WO    02/44664 A1    6/2002

* cited by examiner

*Primary Examiner*—Harshad Patel
(74) *Attorney, Agent, or Firm*—Bracewell & Giuliani LLP

(57) ABSTRACT

Multi-phase flow is estimated in a flow meter having a first and a second stage by empirically deriving an algorithm for the water and gas fractions, measuring pressures within the flow meter, and estimating a total mass flow rate based on the measured pressures. A corrected total mass flow rate is calculated using a liquid/gas slip correction technique. The oil fraction can be determined from the corrected total mass flow rate and gas and water fractions.

21 Claims, 3 Drawing Sheets

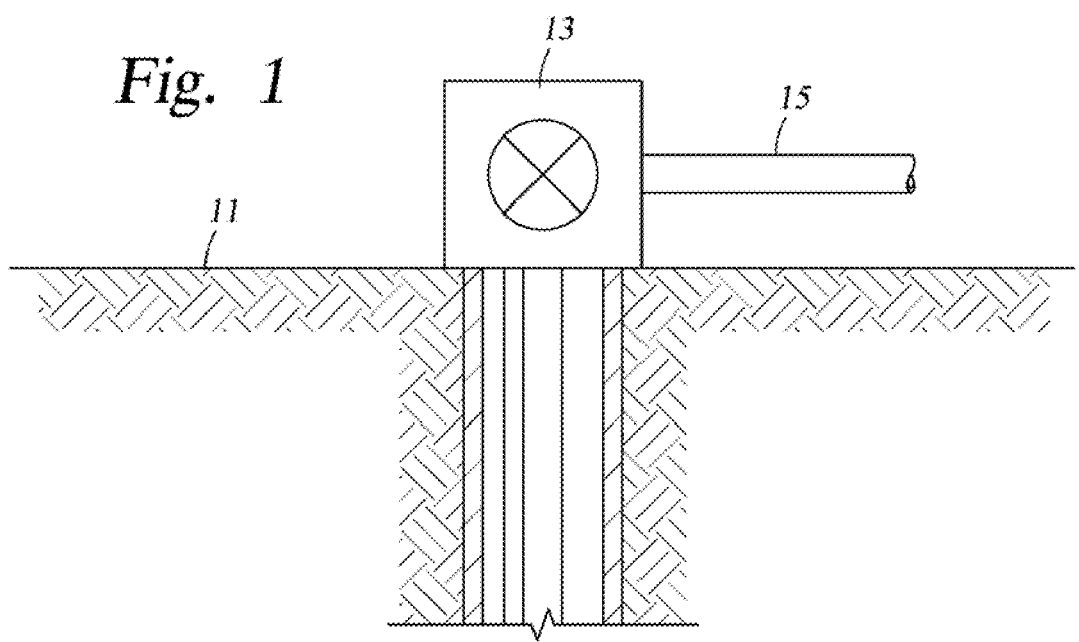
Fig. 1
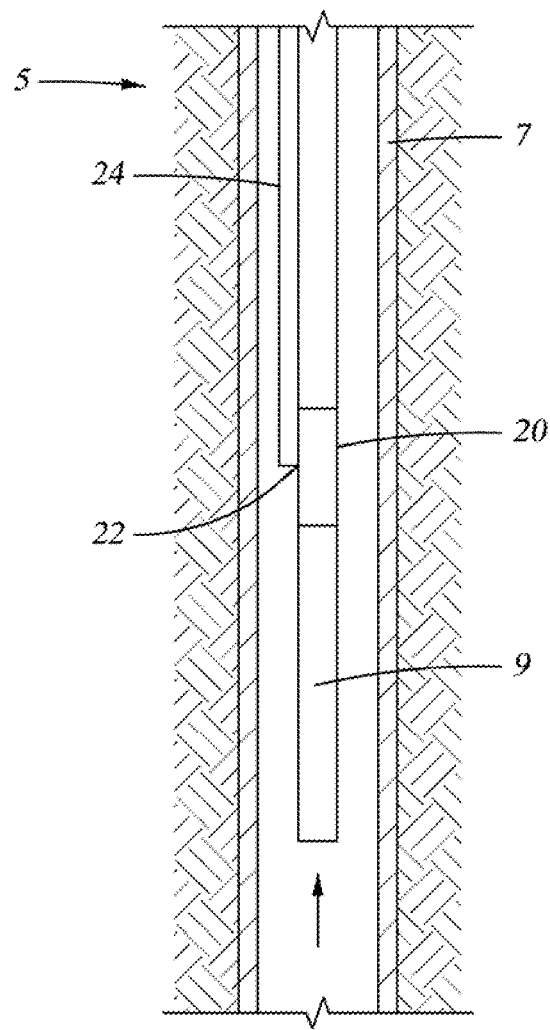

US 7,707,897 B2

METHOD OF MEASURING MULTIPHASE FLOW USING A MULTI-STAGE FLOW METER

FIELD OF THE INVENTION

This invention relates in general to wellbore fluid production and more specifically to a method of measuring multiphase fluid flow using a two stage flow meter.

BACKGROUND OF THE INVENTION

Flowmeters are often used for measuring flow of fluid produced from hydrocarbon producing wellbore. The flowmeter may be deployed down hole within a producing wellbore, a jumper or caisson used in conjunction with a subsea wellbore, or a production transmission line used in distributing the produced fluids. Monitoring fluid produced from a wellbore is useful in wellbore evaluation and to project production life of a well. In some instances transmission lines may include fluid produced from wells having different owners. Therefore proper accounting requires a flow measuring device that monitors the flow contribution from each owner.

The produced fluid may include water and/or gas mixed with liquid hydrocarbon. Knowing the water fraction is desirable to ensure adequate means are available for separating the water from the produced fluid. Additionally, the amount and presence of gas is another indicator of wellbore performance, and vapor mass flow impacts transmission requirements. Flowmeters can be employed that provide information regarding total flow, water cut amount, and gas fractions. However, these often require periodic analysis of the fluid entering the flowmeter. This may involve deploying a sample probe upstream of the flowmeter; which can produce inaccuracy, and may interrupt or temporarily halt fluid production.

SUMMARY OF THE INVENTION

Disclosed herein is a method of estimating multi-phase fluid flow through a two stage flow meter comprising measuring fluid conditions within the flow meter and the flow meter exit, calculating an initial estimated value of total fluid flow ($q_{m,\,old}$) through the flow meter, calculating a differential pressure measurement correction factor based on the initial estimated value of total fluid flow, calculating a new estimated value of total fluid flow ($q_{m,\,new}$) through the flow meter using the differential pressure measurement correction factor, calculating a new correction factor based on $q_{m,\,new}$, new and setting $q_{m,\,old}$ equal to $q_{m,\,new}$, new, comparing the values of $q_{m,\,old}$, old with $q_{m,\,new}$, new and repeating if $q_{m,\,old}$, old and $q_{m,\,new}$, new are not equal, and calculating a corrected value of total fluid flow when $q_{m,\,old}$, old and $q_{m,\,new}$, new are equal. The method further comprises empirically deriving a fluid flow predictive algorithm by flow testing the flow meter. Flow testing the flow meter comprises conducting multiple flow tests and measuring fluid conditions within the flow meter, wherein the flow tests vary the gas fraction, water fraction, and fluid type. The algorithm comprises a fluid characteristic model of a gas fraction model and a water fraction model.

The method comprises estimating a fluid fraction using an empirically derived relationship, the fluid fraction selected from a list consisting of water fraction and gas fraction. The method of claim 1, wherein the flow meter comprises n zones, each zone providing a reduced flow diameter (dn) in the flow meter and a fluid measuring tap disposed downstream of the nth zone. The flowmeter may include a fluid measuring tap upstream of a first one of the zones, within the first zone, in a last one of the zones, and between adjacent one of the zones. Pressure and temperature transducers may be in communication with the fluid measuring tap. In one embodiment, zone one has a reduced diameter d1, zone two has a reduced diameter d2, and zone three has a reduced diameter d3, wherein d2>d1>d3. In one embodiment, of the method the step of measuring fluid conditions at the flow meter exit includes measuring flow meter exit pressure, the method further comprising estimating a fluid gas volume fraction based on the flow meter exit pressure and estimating total mass flow based on the estimated gas volume fraction.

An alternative method of measuring flow of a two phase fluid through a multi-stage flow meter comprises, measuring fluid pressure values within the flow meter and the flow meter exit, estimating a fluid vapor fraction using an empirically derived relationship, wherein the relationship is based on the flow meter exit pressure, estimating a fluid flow rate through the flow meter based on the fluid vapor fraction and pressures measured within the flow meter, and correcting the estimated fluid flow rate using an iterative regression technique thereby obtaining iterated flow values, continuing the regression technique until successive iterated flow values are within a set range, and selecting the successive iterated flow values within the range as the corrected fluid flow rate. The regression technique may comprise a De Leeuw correction. The method may further comprise disposing the flow meter in a hydrocarbon producing wellbore and measuring fluids produced from the wellbore.

The present disclosure also includes a method of measuring flow characteristics of a multiphase fluid comprising, directing a multiphase fluid stream having fractions of water and gas through a venturi flow meter, the meter having restricted flow zones therein, measuring pressure at the flow meter exit, and estimating a fraction amount using an empirically derived equation based on the measured flow meter exit pressure.

BRIEF DESCRIPTION OF THE DRAWINGS

FIG. 1 is a side partial cut-away view of a cased wellbore having production tubing, and a flowmeter in the production tubing.

DETAILED DESCRIPTION OF THE INVENTION

Figure 2:
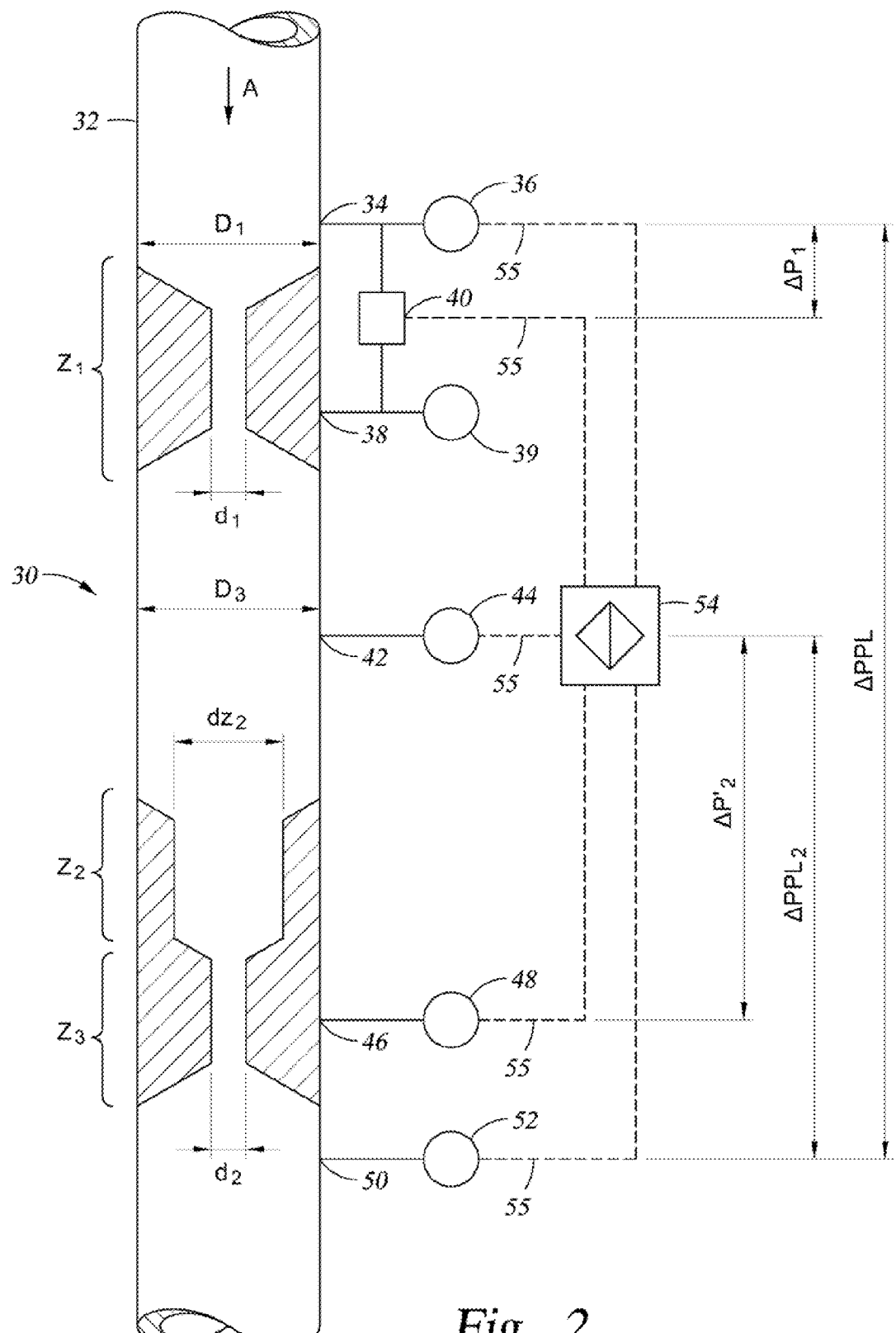
FIG. 2 is a side cut-away view of an embodiment of a two-stage flow meter.

The present invention will now be described more fully hereinafter with reference to the accompanying drawings in which embodiments of the invention are shown. This invention may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout. For the convenience in referring to the accompanying figures, directional terms are used for reference and illustration only. For example, the directional terms such as "upper", "lower", "above", "below", and the like are being used to illustrate a relational location.

It is to be understood that the invention is not limited to the exact details of construction, operation, exact materials, or embodiments shown and described, as modifications and equivalents will be apparent to one skilled in the art. In the drawings and specification, there have been disclosed illustrative embodiments of the invention and, although specific terms are employed, they are used in a generic and descriptive sense only and not for the purpose of limitation. Accordingly, the invention is therefore to be limited only by the scope of the appended claims.

The present method includes directing a fluid through a flow meter, measuring fluid conditions in the flow meter, and empirically developing algorithms that model the fluid gas fraction, water fraction, oil fraction, and total flow. Different fluids can be flow tested, where the fluids differ in fluid property, composition, gas fraction, and water fraction. Additionally, multiple flow rates can be tested for each fluid or different fluids. In one embodiment, the flow meter exit pressure is a fluid condition considered when developing the algorithm and when using the meter to measure flow.

A side partial cross sectional view of a hydrocarbon producing wellbore 5 is provided in FIG. 1. The wellbore 5 is lined with casing 7 and includes production tubing 9 disposed within the wellbore 5. The production tubing 9 receives and delivers produced fluids from the wellbore 5 to a wellhead assembly 13. The wellhead assembly 13 is seated on top of the wellbore 5 and attached to a production line 15 on surface for distributing the produced fluid for further processing. A schematical view of a flowmeter 20 is provided inline with the production tubing 9 and disposed in the wellbore 5. An instrument tap 22 is shown inserted into the flowmeter 20. The instrument tap 22 may include a pressure or temperature transducer connected to a dataline 24, wherein signal data from the transducer is transmitted through the dataline 24 to surface for monitoring. The present device may include multiple instrument taps with one or more datalines attached for delivering representative signal data for downhole fluid condition monitoring.

FIG. 2 is a partial cross sectional view of a flowmeter 30 that is usable with the method described herein. Pressure readings taken from the flowmeter 30 during flow testing can be used for creating an algorithm that models fluid flow through the flowmeter 30. Optionally, temperature measurements may also be taken within the flowmeter 30. The flowmeter 30 comprises a generally tubular flowmeter housing 32 and diameter restrictions in zones along the housing 32. In one embodiment, the restrictions resemble that of a venturi flowmeter, wherein the flow diameter gradually changes from a larger to a smaller value and downstream gradually increases to substantially the original large diameter value. This is in contrast to an orifice meter that generally has an abrupt change in flow diameters.

The flow of fluid through the flowmeter 30 is represented by arrow A at the entrance to the flowmeter 30. The housing 32 diameter proximate to the entrance is represented by $D_1$. The flow diameter reduces to a throat having a diameter represented by $d_1$. The flow diameter then gradually increases from $d_1$ to $D_3$, where $D_3$ is substantially the same in value as $D_1$. For the purposes of discussion herein, zone one ($Z_1$) identifies the portion of the flowmeter 30 having the aforementioned reduced diameter $d_1$. The flowmeter 30 of FIG. 2 includes two additional flow diameter restrictions. One restriction reduces the flow diameter from $D_3$ to a reduced diameter $d_{z2}$. The area within the flowmeter 30 where the diameter reduces to $D_{z2}$, and wherein the diameter of flow area is equal to $d_{z2}$, is referred to herein as zone two ($Z_2$). A flow zone three ($Z_3$) is shown immediately downstream of zone two. Zone three provides a restricted diameter of $d_2$, wherein the value of $d_2$ is less than the value of $d_{z2}$. Downstream of zone three, the flow diameter is gradually increased to be substantially equal to the inner diameter of the housing 32.

Various taps are shown schematically on the upper side of the housing 32; the taps are configured to receive probes that measure fluid pressure, fluid temperature, or both. An instrument tap 34 is formed through the housing 32 just upstream of zone one. The instrument tap 34 communicates measurements to a transducer 36 that measures fluid properties and converts them to a corresponding data signal that can be received and monitored. Optionally a communication link 55 in combination with a data receiver 54 can receive the data for recording or monitoring by surface personnel. The data receiver 54 can be located downhole or at surface. An additional instrument tap 38 is provided through the housing 32 and along the area of zone one. A pressure differential gauge 40 is disposed between the instrument tap 38 and instrument tap 34 that measures the fluid pressure differential(s) between these two points. A transducer 39 can optionally be included and in communication with the instrument tap 38. The differential pressure between instrument tap 34 and instrument tap 38 can be measured by comparing the readings of transducer 36 and transducer 38. This recorded value can also be transmitted to the data receiver 54. Additional instrument taps (42, 46, 50) are provided in the housing 32 respectively between the first and second zone, within a third zone, and downstream of the third zone at the flowmeter exit. Corresponding transducers (44, 48, 52) are inserted within the pressure taps (42, 46, 50). The transducers (44, 48, 52) are connected to the communication link 55 coupled with the data receiver 54. Accordingly the pressure and/or temperature at each of these locations within the flowmeter can be measured while in service and monitored at a remote location for fluid flow measurements with the flowmeter 30.

For the purposes of illustration, pressure differentials between the pressure taps are illustrated that correspond to the location of the instrument taps. $\Delta P_1$ represents the pressure differential between instrument taps 34 and 38; $\Delta PPL$ represents the pressure differential between instrument tap 34 and instrument tap 50; $\Delta PPL_2$ represents the pressure differential between instrument tap 42 and instrument tap 50; and $\Delta P_2'$ represents the pressure differential between instrument tap 42 and instrument tap 46.

An advantage of the present method is the empirically derived algorithm can determine the gas volume fraction (GVF) without the use of a secondary methodology, e.g. fluid analysis to determine the fluid properties of the gas. An example of a secondary methodology is measuring the volumetric shrinkage co-efficient of a wellbore fluid such as oil and the produced gas oil ratio. The method disclosed herein includes flow testing the flowmeter 30 of FIG. 2 and empirically deriving algorithms based on those tests. The algorithms incorporate a permanent pressure loss measurement ($\Delta PPL_2$) across the second and third zones ($Z_2$, $Z_3$). $\Delta PPL_2$ represents a pressure differential measured between the instrument tap 42 and the instrument tap 50. A measurement taken at the instrument tap 50 represents a pressure at the flowmeter 30 exit. Considering the pressure measurement at the flowmeter 30 exit, the empirical method yields an algorithm for estimating the water fraction or the water cut (WC) exiting the flow meter 30 (equation 1a):

$$\text{Watercut, } WC = \frac{V_{W2}}{V_2} = e^{\left(\alpha_2 \left(\frac{\Delta PPL_2}{\Delta P_2'} + k\right)\right)}. \qquad \text{Eqn. 1a}$$

$V_{W2}$ and $V_2$ are the water volume and total fluid volume within $Z_3$ respectively; $\alpha_2$ is a coefficient which is dependent on the density difference between the gas and the liquid. The coefficient is empirically derived for the different density of gas and water. The coefficient k is the gauge correction factor which corrects for the drift associated with the gauges.

Similarly, the fluid's GVF flowing through the tool can be estimated based on the ratio of the pressure differential measured at the instrument tap 34 and instrument tap 50 ($\Delta PPL$) and the pressure differential measured at instrument tap 42 and instrument tap 50 ($\Delta P_2'$). The resulting algorithm used for estimating the fluid's GVF is shown below as equation 1b.

$$GVF = \frac{V_{G2}}{V_2} = \kappa_2 \ln\left(\lambda \cdot \frac{\Delta PPL}{\Delta P_2'}\right). \qquad \text{Eqn. 1b}$$

In equation 1b, $V_{G2}$ represents gas volume at $Z_3$ and $\kappa_2$ is a proportionality factor. The proportionality factor is an empirically derived value that considers the flow regime and the flow meter 30 inclination. The second factor $\lambda$ is also empirically derived and dependent on the density difference between the gas and the oil of the fluid flow.

Knowledge of the gas and/or water fraction in a fluid stream can be useful in transmitting the fluid flow. For example, knowledge of the gas or water fraction in a process system can indicate if the process is operating within expected design conditions. Accordingly evidence of an out of specification fraction could indicate an upset or other excursion condition that can be reconciled with appropriate action. One example of appropriate action is to regulate downstream flow. Similarly, when measuring production fluid within a hydrocarbon producing wellbore with a flowmeter, recorded fluctuations of gas and/or water fraction values could represent undesirable downhole conditions. This may include gas breakout and waterfront migration into the wellbore. In some instances the undesirable conditions are improved or corrected by regulating flow at the wellhead. Thus, wellhead flow regulation can be dependent on the monitored downhole fractions.

Because of gas expansion caused by localized pressure drop in the flow meter 30, the present method considers fluid gas fraction when initially estimating total flow through the meter. Estimating the gas fraction the total mass flow rate can be determined from equations 2 and 3. The total mass flow rate is determined using the following parameters:

$$q_m = q_{Z1} \text{ for liquid volume fraction, } LVF > 80\% \qquad \text{Eqn. 2a}$$

$$q_m = q_{Z3} \text{ for liquid volume fraction, } LVF \leq 80\% \qquad \text{Eqn. 2b}$$

Here $LVF = 1 - GVF$, $q_m$ is the total mass flow rate, and $q_{Z1}$ and $q_{Z3}$ are calculated mass flow rates at zones one and three respectively.

$$q_{m1} = \frac{C_1 d_1^2}{\sqrt{1 - \beta_1^4}} \sqrt{2g\rho_1 \cdot \Delta P_1}. \qquad \text{Eqn. 3a}$$

$$q_{m2} = \frac{C_2 d_2^2}{\sqrt{1 - \beta_2^4}} \sqrt{2g\rho_2 \cdot \Delta P_2'}. \qquad \text{Eqn. 3b}$$

Here, $C_1$ and $C_2$ are discharge coefficients related to the flow at each of the venturi.

$$\beta_1 = \frac{d_1}{D_1} \text{ and } \beta_2 = \frac{d_2}{D_3}$$

$D_1$ and $D_3$ represent the values of the diameter at the respective first and second zone inlets, as shown in FIG. 2;

$d_1$ and $d_2$ represent diameter values at the throat to the first and second zone inlets, as shown in FIG. 2;

g represents the gravitational acceleration; and $\rho_1$ and $\rho_2$ represent fluid densities in the first and second zones.

Note that $q_m = q_v \cdot \rho$ where $q_v$ is the volumetric flow rate and $\rho_2$ is calculated via the fluid column hold-up method. It is assumed the mass flow is conserved, therefore, $q_{m1} = q_{m2} = q_m$. As mass is conserved throughout the system, equating equation 3a to 3b forms the following relationship:

$$\frac{\rho_1}{\rho_2} = \frac{\delta_2 \Delta P_2'}{\delta_1 \Delta P_1}. \qquad \text{Eqn. 4}$$

Combining equations 3 and 4 yields, $$\delta_2 = \frac{C_2^2 d_2^4}{1 - \beta_2^4} \text{ and } \delta_1 = \frac{C_1^2 d_1^4}{1 - \beta_1^4}.$$

The fluid density at the first zone ($\rho_1$) can be calculated based on the equations shown. The fluid density in the second zone ($\rho_2$) is determined using the liquid holdup method based on a remote pressure, temperature gauge placed at a separation distance from the flow meter 30. The measured temperature and/or pressure can be upstream or downstream of the flow meter 30. An example of the liquid holdup method is demonstrated in equation 9 below.

As noted above, a slip effect is caused by the mix of vapor and liquid in the fluid that produces a phenomenon referred to herein as over reading. Changes in vapor density with pressure also introduce inaccuracies in measuring fluid flow. Accurately calculating the mass flow involves correcting the differential pressure measurement for the effect of gas compression and slip effects. In one embodiment the present method employs the De Leeuw correction to compensate for these effects. This includes first determining the Lockhart Martinelli Number (LM) using the relationship provided in equation 5 below. Equation 5 requires the liquid flow rate, $Q_L$ and gas flow rate, $Q_g$ as well as the individual density of the liquid, $\rho_1$ and the gas phase $\rho_g$.

$$\text{Lockhart Martinelli No., } X = \frac{Q_L}{Q_g} \sqrt{\frac{\rho_l}{\rho_g}}. \qquad \text{Eqn. 5}$$

Equation 5 requires the liquid flow rate, $Q_L$ and gas flow rate, $Q_g$ as well as the individual density of the liquid, $\rho_1$ and the gas phase $\rho_g$.

Here:

$$Q_L = q_m \cdot \rho \cdot (1-GVF) \qquad \text{Eqn. 6a}$$

and $$Q_g = q_m \cdot \rho \cdot (GVF) \qquad \text{Eqn. 6b.}$$

When the fluid being measured is a wellbore downhole fluid, the fluid densities can be obtained utilizing pressure and temperature readings. The gas can be assumed to be methane, while liquids can initially be collected and evaluated during drilling. The liquids collected during drilling may be analyzed to provide an initial estimate of borehole liquid density. During the time the flowmeter 30 is in use downhole, fluids may be collected and analyzed at surface to correct for changes in liquid composition that affect fluid properties. Knowing the LM number, the over reading value can be calculated using equations 7a and 7b below:

Over reading; $\phi \sqrt{1+CX+X^2}$ \qquad Eqn. 7a;

Ratio metric density;

$$C = \left(\frac{\rho_L}{\rho_g}\right)^n + \left(\frac{\rho_g}{\rho_L}\right)^n. \qquad \text{Eqn. 7b}$$

Exponent n is an empirically derived value obtained from the relationship of equation 7c below.

$$n = 0.706(1 - e^{-0.746 Fr_g}) \qquad \text{Eqn. 7c.}$$

The term $Fr_g$ is Froude number obtained from equation 7d below.

$$Fr_g = \frac{v_{s,gas}}{\sqrt{gD_n}} \sqrt{\frac{\rho_g}{\rho_l - \rho_g}}. \qquad \text{Eqn. 7d}$$

In equation 7d, the term g represents the gravitational constant and $D_n$ represents the respective value of the diameter at the inlet of the first or second zones ($Z_1$, $Z_2$) in the flowmeter 30. The Froude number also depends on the superficial gas velocity ($v_{s,gas}$), and thus is dependent on the gas volume fraction of equations 2a and 2b. A value for the superficial gas velocity ($v_{s,gas}$) is obtained using the relationship in equation 7e below.

$$v_{s,gas} = \frac{q_m \cdot GVF \cdot \rho}{\pi \left(\frac{D_n}{2}\right)^2}. \qquad \text{Eqn. 7e}$$

The present method further includes dividing the initial total flow estimate ($q_{old}$) by the over reading factor $\phi$ obtained from equation 7a to obtain an updated or new estimate of total flow ($q_{m, new}$), see equation 8.

$$q_{m,new} = \frac{q_{m,old}}{\varphi}. \qquad \text{Eqn. 8}$$

The value of $q_{m, old}$ is compared to the value of $q_{m, new}$. If $q_{m, old}$ and $q_{m, new}$ differ, the method includes recalculating the over reading value from equations 5-7. When recalculating the over reading factor $\phi$, the value of $q_{m, new}$ from equation 8 is substituted for $q_m$ in equations 5-7. The value of $q_{m, new}$ is labeled $q_{m, old}$ and equation 8 is recalculated using the updated q values and over reading factor $\phi$. This process is iteratively repeated until $q_{m, old}$ and $q_{m, new}$ are equal or substantially equal. Optionally, the difference between $q_{m, old}$ and $q_{m, new}$ may be within a range. Upon, completing the iterative analysis, the mass flow $q_m$ is set equal to the value of $q_{m, new}$. In one embodiment, the method involves regression analysis to obtain a value for the total mass flow through the flowmeter 30.

Once the mass flow rate, $q_m$ and the gas volume fraction is determined, either/both the oil volume fraction and water fraction can be calculated based on the density measurement. Calculating the fractions can be done using equation 1a and determining the individual component of oil and water mass flow rate. Alternatively a fluid hold-up method can be employed to determine the density of the fluid, $\rho_2$. The density can then be used to infer the water cut of the fluid. This is based on incorporating a remote sensor at a distance, d away from the flow meter either upstream or downstream, where the sensor can measure pressure and optionally temperature.

The conservation of mass provides the following relationships:

$$\rho_2 \cdot V_2 \rho_{O2} \cdot V_{O2} + \rho_{G2} \cdot V_{G2} + \rho_{W2} \cdot V_{W2}$$

$$V_2 = V_{O2} + V_{W2} + V_{G2}$$

$$\rho_2 \cdot V_2 = \rho_{O2} \cdot (V_2 - V_{G2} - V_{W2}) + \rho_{G2} \cdot V_{G2} + \rho_{W2} \cdot V_{W2}$$

Rearranging these relationships results in equation 9 below:

$$WC = \frac{V_{W2}}{V_2} = \frac{(\rho_2 - \rho_{O2})}{(\rho_{W2} - \rho_{O2})} - \frac{(\rho_{G2} - \rho_{O2})}{(\rho_{W2} - \rho_{O2})} GVF. \qquad \text{Eqn. 9}$$

GVF can be obtained from equation 1 and the fluid densities can be determined from pressure and temperature readings. Knowing the water fraction and gas fraction, the oil fraction can be calculated from equation 10 below:

$$OVF = 1 - WC - GVF \qquad \text{Eqn. 10.}$$

To improve flow quantification, the emulsification effects for oil and water can be considered when determining the viscosity of oil-water emulsion. The emulsification effects can affect the discharge coefficient, C that is used to calculate mass flow rates (see equation 3).

Figure 3:
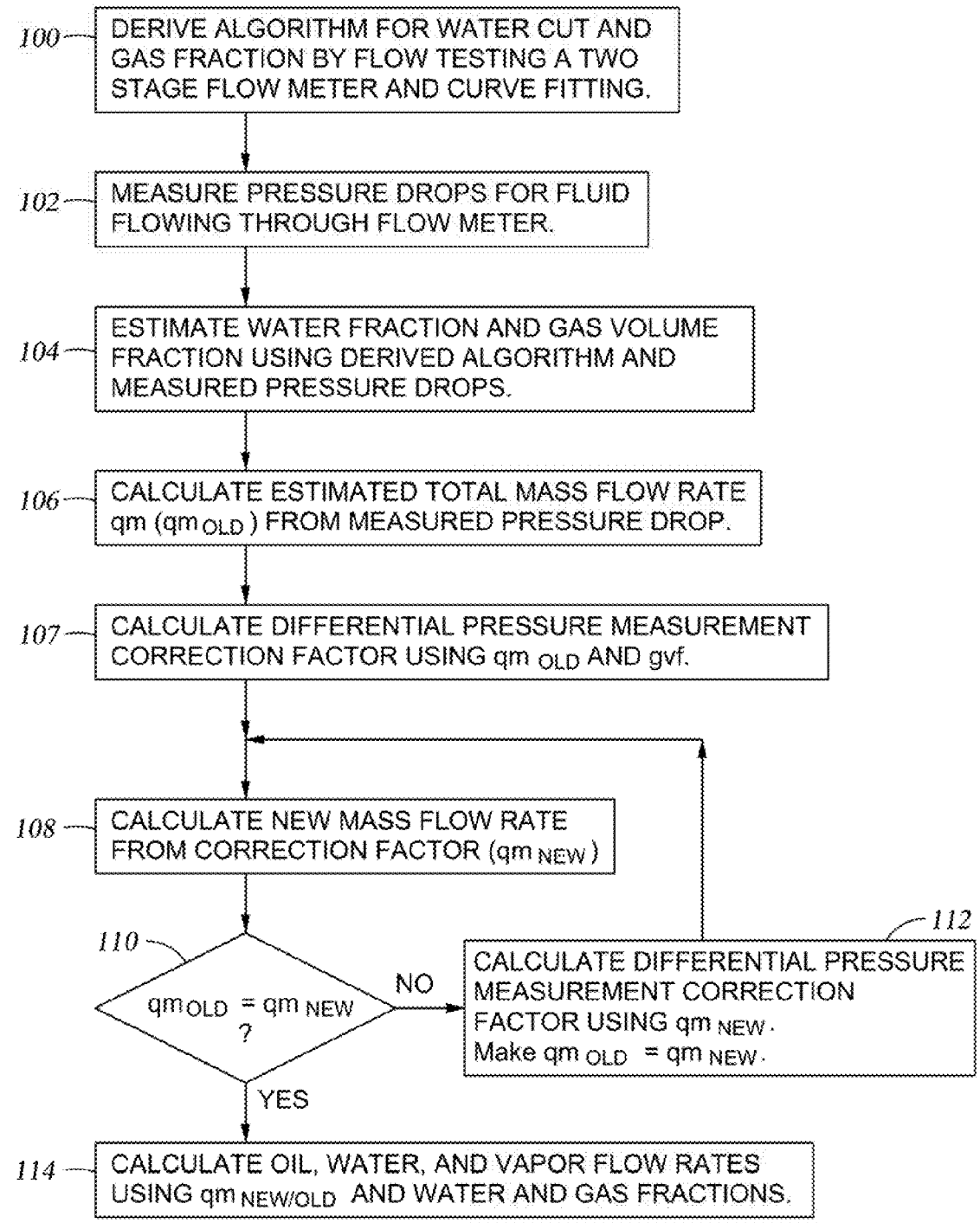
FIG. 3 is flowchart illustrating an embodiment of a flow determination method.

FIG. 3 represents an embodiment of the present method in flow chart form. As described by this method, algorithms are empirically derived that model the water cut and/or vapor fraction in an amount of measured fluid. The algorithms are developed by flow testing a two stage flowmeter, such as that of FIG. 2, measuring pressure at one or more points within the flowmeter and then performing a curve fitting technique from the measured data to derive the algorithm. Step 100. As noted above, the flow testing can be done on a multitude of different fluids, wherein the different fluids may all be liquid, all gas or multi-phase fluids. Fluids may comprise different compositions and have varied fluid properties. Fluid testing a wide variety of fluids can provide empirically derived algorithms usable for a wide range of fluids as well.

The method further includes directing fluid through the flowmeter, and measuring pressure within the flowmeter. Step 102. This step of measuring may take place within a hydrocarbon producing wellbore, a jumpover or a caisson, a transmission line, or any line having fluid, whether or not is associated with a hydrocarbon producing wellbore. Thus the flowmeter 30 can be placed within any line used for transferring a fluid. Substituting the values of measured pressure found in step 102 into the algorithms of step 100, estimates for the liquid volume fraction, gas volume fraction, and water amount can be estimated. Step 104.

An initial estimate of the total mass flow rate $q_m$ is calculated. The calculation is dependent upon the gas fraction within the fluid flow. If the gas fraction is less than 20%, the estimated fluid flow will be initially assumed to be the amount flowing into the flowmeter 30. When the liquid volume fraction is equal to 80% or less than total flow, the total mass flow rate is estimated to be equal to the flowmeter 30 exit based on a measured pressure drop. Step 106. Having an initial estimated flow rate and a gas volume fraction, a De Leeuw correction is performed to compensate for the slip effect of the gas present in the fluid. (Equations 5 through 7). Step 107. The estimated flow rate $q_{m,old}$ is divided by the correction factor to obtain a corrected flow rate $q_{m,new}$. Step 108. The old and the new flow rates are then compared. Step 110. If the flow rates differ, the correction factor is recalculated using $q_{m,new}$ as the flow rate in these equations. Step 112. Additionally, the value of $q_{m,old}$ is set to be the same as $q_{m,new}$. Steps 108 and 110 are repeated until $q_{m,old}$ is substantially the same as $q_{m,new}$. When these values are equal or substantially the same, the total flow rate can be established and using the previously obtained values of gas and water fractions, the mass flow rates for the gas and water can be estimated. Step 114.

One of the many advantages of the present device and method is the ability to install the flowmeter and accurately measure flow in a remote or otherwise inaccessible location. Moreover, the present device and method can provide accurate measurements of total flow, water cut, and gas fraction by pressure and/or temperature measurements. Periodic flow sampling is not required.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims. While the invention has been shown in only one of its forms, it should be apparent to those skilled in the art that it is not so limited but is susceptible to various changes without departing from the scope of the invention.

The invention claimed is:

1. A method of estimating multi-phase fluid flow through a two stage flow meter comprising:
   a. measuring fluid conditions within the flow meter and the flow meter exit;
   b. calculating an initial estimated value of total fluid flow ($q_{m,old}$) through the flow meter
   c. calculating a differential pressure measurement correction factor based on the initial estimated value of total fluid flow;
   d. calculating a new estimated value of total fluid flow ($q_{m,new}$) through the flow meter using the differential pressure measurement correction factor;
   e. calculating a new correction factor based on $q_{m,new}$ and setting $q_{m,old}$ equal to $q_{m,new}$;
   f. comparing the values of $q_{m,old}$ with $q_{m,new}$ and repeating steps (c) through (e) if $q_{m,old}$ and $q_{m,new}$ are not equal; and
   g. calculating a corrected value of total fluid flow when $q_{m,old}$ and $q_{m,new}$ are equal.

2. The method of claim 1 further comprising empirically deriving a fluid flow predictive algorithm by flow testing the flow meter.

3. The method of claim 2, wherein flow testing the flow meter comprises conducting multiple flow tests and measuring fluid conditions within the flow meter, wherein the flow tests vary the gas fraction, water fraction, and fluid type.

4. The method of claim 2, wherein the algorithm comprises a fluid characteristic model, the characteristic selected from the list consisting of a gas fraction model and a water fraction model.

5. The method of claim 1 further comprising estimating a fluid fraction using an empirically derived relationship, the fluid fraction selected from a list consisting of water fraction and gas fraction.

6. The method of claim 1, wherein the flow meter comprises n zones, each zone providing a reduced flow diameter ($d_n$) in the flow meter and a fluid measuring tap disposed downstream of the $n^{th}$ zone.

7. The method of claim 6, wherein the flow meter further comprises a fluid measuring tap upstream of a first one of the zones, within the first zone, in a last one of the zones, and between adjacent one of the zones.

8. The method of claim 6, wherein a pressure and temperature transducer is in communication with the fluid measuring tap.

9. The method of claim 6, wherein the flow meter comprises a zone one having reduced diameter $d_1$, a zone two having reduced diameter $d_2$, and a zone three having reduced diameter $d_3$, wherein $d_2 > d_1 > d_3$.

10. The method of claim 9 further comprising measuring fluid condition upstream of zone one, in zone one, between zone one and zone two, and in zone three.

11. The method of claim 10, further comprising estimating a fluid water fraction based on a pressure differential of the fluid pressures measured at the flow meter exit and the region between zone one and zone two.

12. The method of claim 10, further comprising estimating a fluid gas fraction based on a pressure differential of the fluid pressures measured at the flow meter exit and upstream of zone one.

13. The method of claim 1 further comprising empirically deriving a water fraction model, wherein the model comprises, $$WC = \frac{V_{W2}}{V_2} = e^{\left(\alpha_2 \cdot \left(\frac{\Delta PPL_2}{\Delta P_2^2} + k\right)\right)}.$$

14. The method of claim 1 further comprising empirically deriving a gas fraction model, wherein the model comprises, $$GVF = \frac{V_G}{V_2} = \beta_2 \ln\left(\lambda \cdot \frac{\Delta PPL}{\Delta P_2^2}\right).$$

15. The method of claim 1, wherein the step of measuring fluid conditions at the flow meter exit includes measuring flow meter exit pressure, the method further comprising estimating a fluid gas volume fraction based on the flow meter exit pressure and estimating total mass flow based on the estimated gas volume fraction.

16. A method of measuring flow of a two phase fluid through a multi-stage flow meter comprising:
- measuring fluid pressure values within the flow meter and the flow meter exit;
- estimating a fluid vapor fraction using an empirically derived relationship, wherein the relationship is based on the flow meter exit pressure;
- estimating a fluid flow rate through the flow meter based on the fluid vapor fraction and pressures measured within the flow meter;
- correcting the estimated fluid flow rate using an iterative regression technique thereby obtaining iterated flow values;
- continuing the regression technique until successive iterated flow values are within a set range; and
- selecting the successive iterated flow values within the range as the corrected fluid flow rate.

17. The method of claim 16 wherein the regression technique comprises a De Leeuw correction.

18. The method of claim 16, wherein the flow meter comprises a venturi meter with zone one, zone two, and zone three, each zone respectively having restricted diameters $d_1$, $d_2$, and $d_3$, wherein $d_2 > d_1 > d_3$.

19. The method of claim 16 further comprising disposing the flow meter in a hydrocarbon producing wellbore and measuring fluids produced from the wellbore.

20. A method of measuring flow characteristics of a multiphase fluid comprising:
- directing a multiphase fluid stream having fractions of water and gas through a venturi flow meter, the meter having three restricted flow zones therein;
- measuring pressure at the flow meter exit; and
- estimating at least one of a gas fraction amount or a water fraction amount using an empirically derived equation based on the measured flow meter exit pressure wherein estimating the water fraction includes measuring fluid pressure between the first and second restricted zones, comparing the measured fluid pressures, and using the compared measured fluid pressures in the step of estimating the water fraction, and wherein estimating the gas fraction includes measuring fluid pressure at the flow meter entrance, comparing the measured fluid pressures, and using the compared pressures in the step of estimating the gas fraction.

21. The method of claim 20 further comprising regulating fluid flow downstream of the flowmeter based on the value of the estimated fraction amount.

* * * * *